United States Patent [19]
Kato et al.

[11] Patent Number: 4,839,750
[45] Date of Patent: Jun. 13, 1989

[54] METHOD AND APPARATUS FOR RECORDING AND/OR REPRODUCING A PCM SIGNAL WITH ASYNCHRONOUS OPERATION

[75] Inventors: Tetsuro Kato; Katsuichi Tachi, both of Kanagawa, Japan

[73] Assignee: Sony Corporation, Tokyo, Japan

[21] Appl. No.: 903,255

[22] Filed: Sep. 3, 1986

[30] Foreign Application Priority Data

Sep. 3, 1985 [JP] Japan ................................ 60-194397
Sep. 10, 1985 [JP] Japan ................................ 60-200160

[51] Int. Cl.$^4$ .................................................. G11B 5/09
[52] U.S. Cl. ........................................ 360/48; 360/32
[58] Field of Search .................... 360/32, 48; 371/44, 371/45

[56] References Cited

U.S. PATENT DOCUMENTS

| | | | |
|---|---|---|---|
| 4,211,997 | 7/1980 | Radnick et al. | 360/32 |
| 4,224,642 | 9/1980 | Mawatari et al. | 360/32 |
| 4,547,887 | 10/1985 | Mui | 371/44 |

FOREIGN PATENT DOCUMENTS

2075792 11/1981 United Kingdom .................. 360/32

Primary Examiner—Raymond F. Cardillo
Assistant Examiner—Kevin J. Fournier
Attorney, Agent, or Firm—Lewis H. Eslinger; Jay H. Maioli

[57] ABSTRACT

This invention relates to method and apparatus for recording and/or reproducing a PCM (pulse-code-modulated) digital audio signal. According to this invention, all samples are recorded by a predetermined data format so that it becomes possible to satisfactorily and accurately record and/or reproduce PCM digital audio signals which are not synchronized with each other.

24 Claims, 8 Drawing Sheets

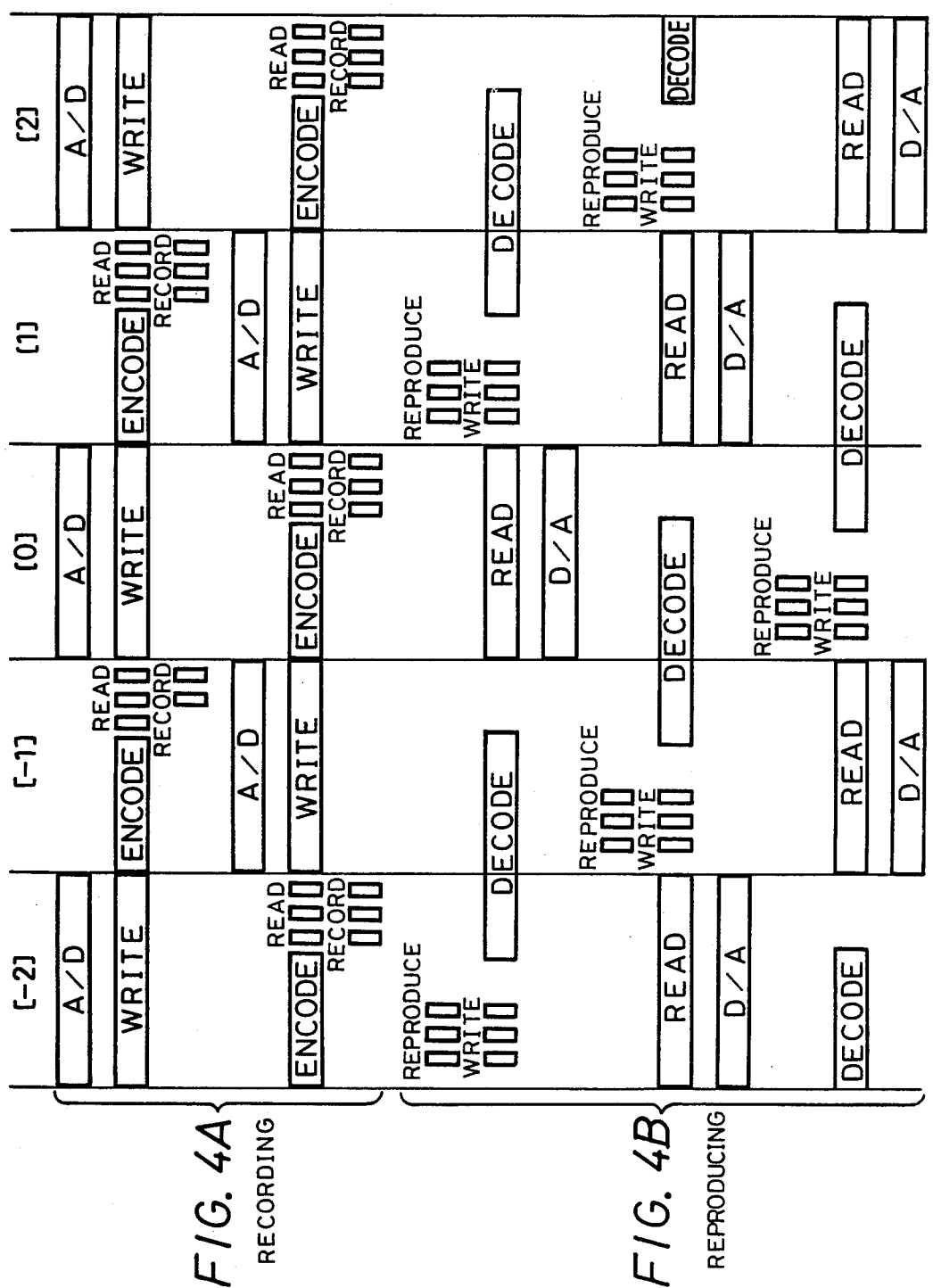
FIG. 4A RECORDING
FIG. 4B REPRODUCING

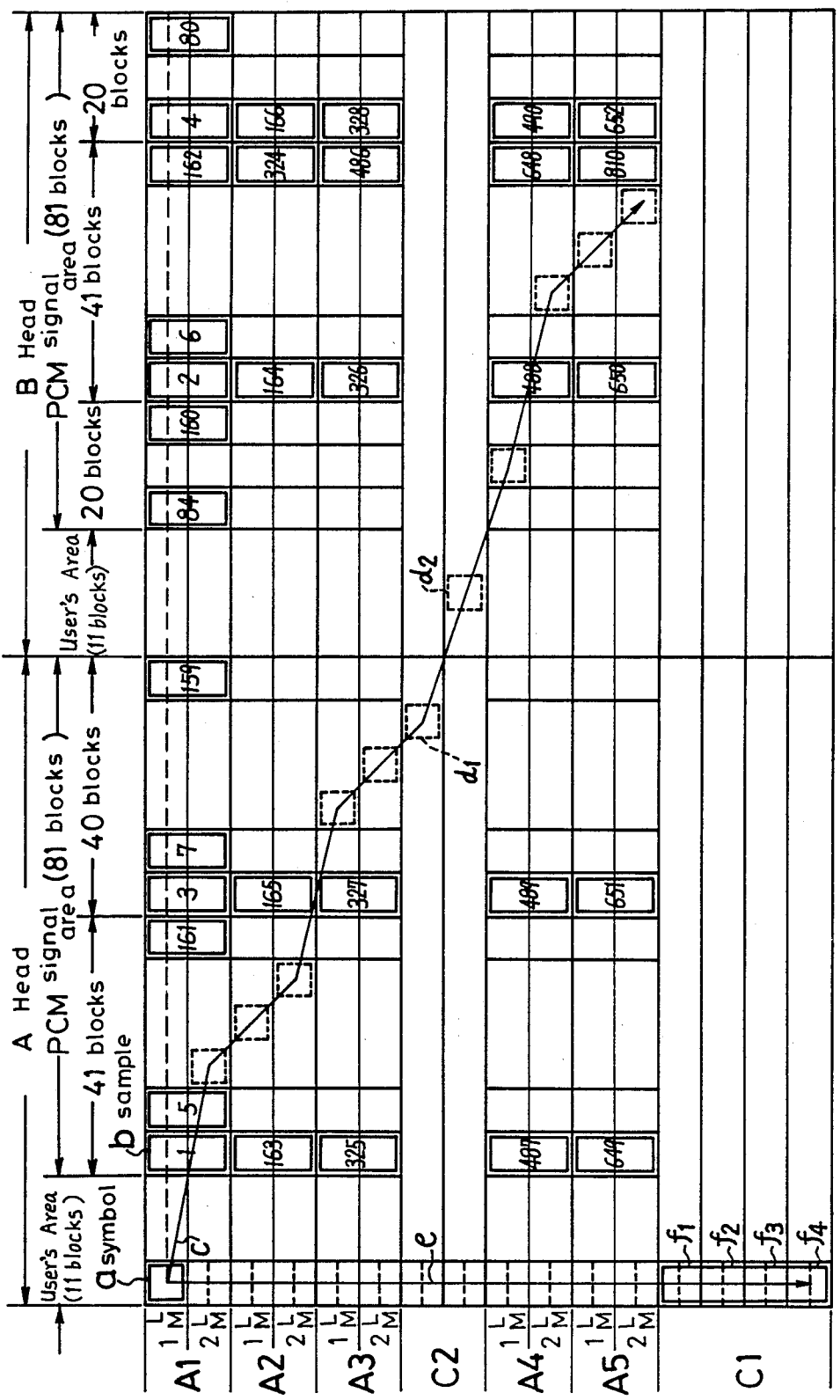

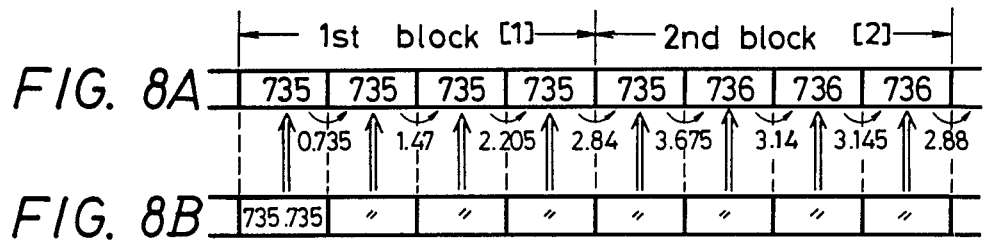
FIG. 8A
FIG. 8B
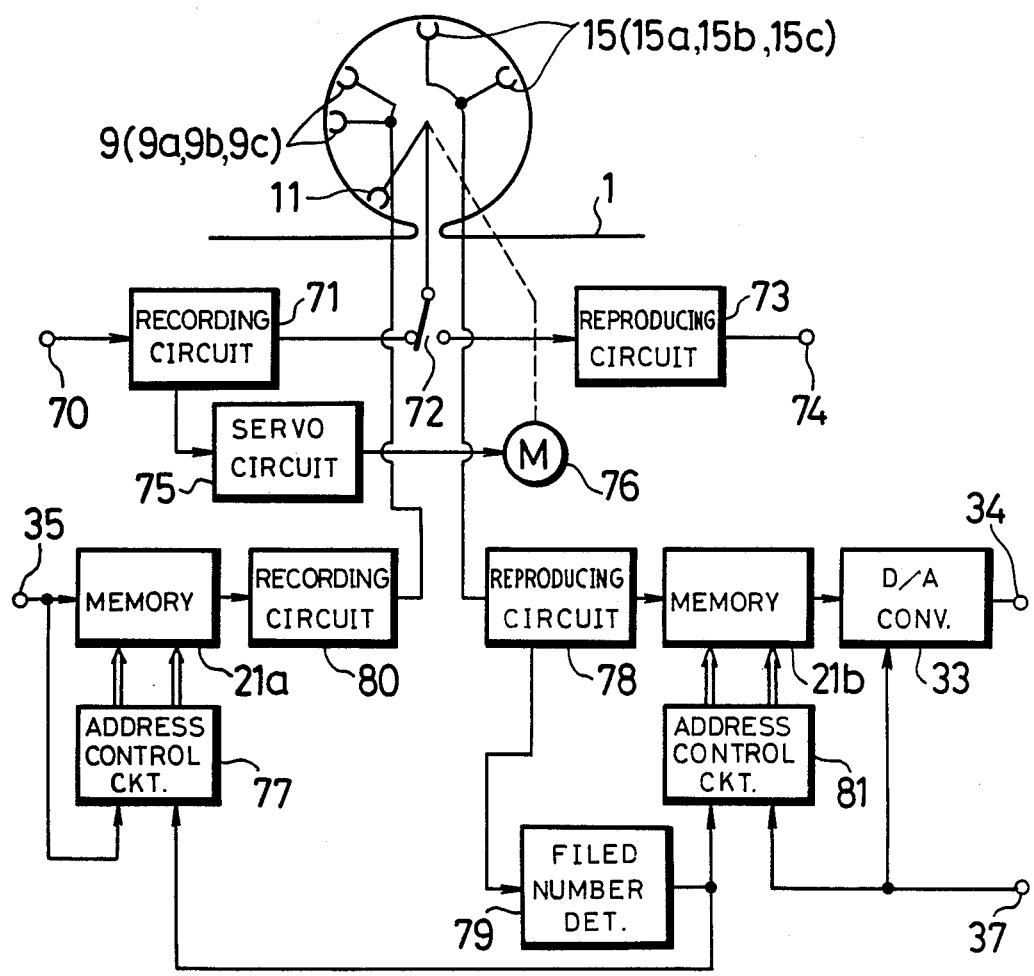
FIG. 9

METHOD AND APPARATUS FOR RECORDING AND/OR REPRODUCING A PCM SIGNAL WITH ASYNCHRONOUS OPERATION

BACKGROUND OF THE INVENTION

1. Field of the Invention

The present invention relates to method and apparatus for recording and/or reproducing a PCM (pulse-code-modulated) signal.

2. Description of the Prior Art

In a video tape recorder (hereinafter simply referred to as VTR) of 1 (or 1.5) rotary head type using a magnetic tape of 1-inch wide, that is, a VTR using so-called SMPTE type C format, two heads are mounted on a rotary drum, this rotary drum is rotated at a revolution rate of one rotation per one field and a magnetic tape is obliquely wrapped around the peripheral surface of this rotary drum with an angle of substantially 360 degrees and transported at a predetermined speed. Of the above mentioned two heads, the video signal is recorded by one head during its video period, while a vertical synchronizing signal is recorded by another auxiliary head during the synchronizing period in which the former head is detached from the magnetic tape.

By the way, in such format, if a so-called time-base corrector is used for a reproduced signal, even when the signal in the synchronizing period is dropped, the normal video signal can be reproduced without trouble if the signal in the video period is obtained. Therefore, it is proposed that in the above mentioned format, instead of the signal in the synchronizing period, a PCM (pulse-code-modulated) digital audio signal be recorded on a skewed track which is narrow in width.

That is, according to the prior art format as described above, the audio signal is recorded in the form of an analog signal by a fixed or stationary head. In such analog recording, especially if the dubbing operation for dubbing an analog audio signal recorded is carried out repeatedly, the quality of the analog audio signal is deteriorated considerably. While, if the audio signal is recorded in the form of a digital signal, it is possible to remove the foregoing problem that the quality of the audio signal is deteriorated in the dubbing operation.

The above mentioned system is disclosed, for example, in Japanese Laid Open Patent Application No. 57-119571.

However, in order to record an audio data of one field period on the synchronizing signal track, the digital data must be timebase-compressed very much and then recorded. This makes the signal processing very difficult. In addition, the recording density becomes large so that the above mentioned system is difficult to realize in the recording and/or reproducing system.

OBJECTS AND SUMMARY OF THE INVENTION

Accordingly, it is an object of this invention to provide a novel method and apparatus for recording and/or reproducing a PCM signal which can remove the defects inherent in the prior art.

It is another object of this invention to provide a novel method and apparatus for recording and/or reproducing a PCM signal which can reduce the influence of data error caused by a dropout and the like.

It is further object of this invention to provide an improved method and apparatus for recording and/or reproducing a PCM signal which can satisfactorily record signals which are not synchronized.

According to one aspect of the present invention, there is provided a method for recording a digital signal, comprising the steps of:
receiving a digital signal consisting of blocks each including a plurality of symbols;
interleaving said plurality of symbols over the extent of each of said blocks;
dividing each of said blocks into a plurality of sub-blocks; and
recording said symbols in said plurality of sub-blocks with a plurality of different recording heads at every sub-block, respectively.

According to another aspect of the present invention, there is provided a method for reproducing a digital signal consisting of blocks each including a plurality of symbols interleaved over the extent of each of said blocks which is divided into a plurality of sub-blocks each recorded on different tracks; the method comprising the steps of: reproducing said symbols of said digital signal with a plurality of different reproducing heads at every sub-block, respectively;
de-interleaving said plurality of symbols over the extent of each of said blocks; and
outputting said de-interleaved symbols.

According to further aspect of the present invention, there is provided an apparatus for recording a digital signal comprising:
means for receiving a digital signal consisting of blocks each including a plurality of symbols;
memory means for storing said digital signal;
address means for interleaving said plurality of symbols over the extent of each of said blocks and for dividing each of said blocks into a plurality of sub-blocks; and
means for recording said symbols in said plurality of sub-blocks with a plurality of different recording heads at every sub-block, respectively.

According to yet further aspect of the present invention, there is provided an apparatus for reproducing a digital signal consisting of blocks each including a plurality of symbols interleaved over the extent of each of said blocks which is divided into a plurality of sub-blocks each recorded on different tracks; the apparatus comprising:
means for reproducing said symbols of said digital signal with a plurality of different reproducing heads at every sub-block, respectively;
means for de-interleaving said plurality of symbols over the extent of each of said blocks; and
means for outputting said de-interleaved symbols.

These and other objects, features and advantages of the present invention will become apparent from the following detailed description of the preferred embodiments taken in conjunction with the accompanying drawings, throughout which like reference numerals designate like elements and parts.

BRIEF DESCRIPTION OF THE DRAWINGS

FIGS. 4A and 4B are schematic representations respectively used to explain the embodiment shown in FIG. 3;

FIGS. 5A and 5B are schematic representations respectively showing an arrangement of an embodiment of an error correction code according to the invention;

FIGS. 8A and 8B are schematic diagrams respectively used to explain the embodiment of the invention; and FIG. 9 is a block diagram showing another embodiment of the invention.

DESCRIPTION OF THE PREFERRED EMBODIMENTS

Now, embodiments of the method and apparatus for recording and/or reproducing a PCM signal according to the present invention will hereinafter be described with reference to the attached drawings. Particularly, a case will be described in which the present invention is applied to a recording and/or reproducing apparatus in which an audio signal is pulse-code-modulated (PCM) and recorded and/or reproduced by a video tape recorder (hereinafter simply referred to as VTR) using a magnetic tape 1-inch wide.

Figure 1:
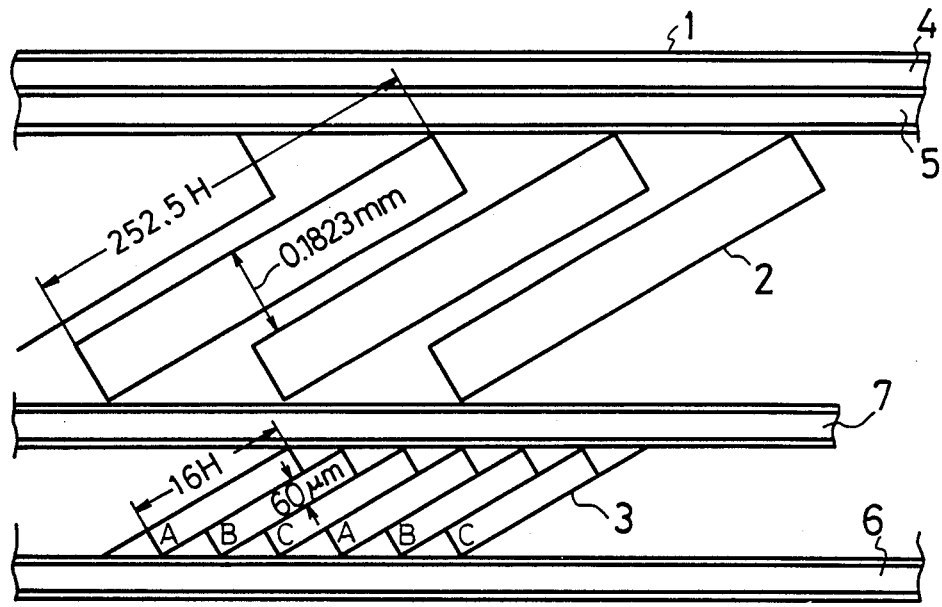
FIG. 1 is a schematic representation showing a track pattern formed on a magnetic tape according to an embodiment of the invention.

In a VTR having 1 (or 1.5) rotary head using a magnetic tape of 1-inch wide, that is, in a VTR having a so-called SMPTE type C format, as shown in FIG. 1, the recording area of a magnetic tape 1 is divided into two area portions along its widthwise direction. A signal in the video period is recorded in the wide area portion separated by the video recording and/or reproducing head so as to form slant video tracks 2. Meanwhile, a PCM audio signal is recorded in the separated narrow width area portion by a plurality of audio heads so as to form PCM audio tracks 3. Between these area portions and on both end edge portions of the magnetic tape 1, there are recorded first, second and third audio tracks 4, 5 and 6 and a control track 7 by fixed heads.

The video track 2 is formed on the magnetic tape 1 with a pitch of, for example, 0.1823 mm and the PCM audio track 3 of about 60 μm wide is formed on a prior art synchronizing track by two or three tracks (A, B and C channels) per one pitch of the video track 2. The length of the PCM audio track 3 is about 16H (H is the horizontal scanning period of the NTSC system). In the case of the NTSC system, 2 or 3 audio tracks are formed, while in the case of the PAL and SECAM systems, since the head tracing speed is relatively low, 3 tracks are formed.

Figure 2A:
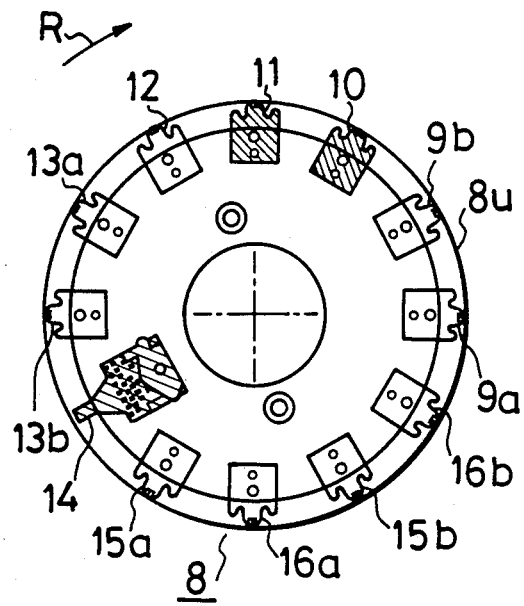
FIG. 2A is a plan view of a rotary head used in a first embodiment of this invention.
Figure 2B:
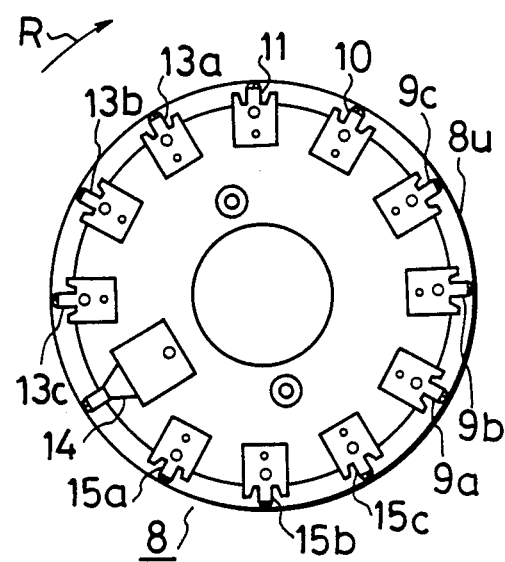
FIG. 2B is a plan view of a rotary head used in a second embodiment of this invention.

FIGS. 2A and 2B each illustrate the arrangement of an upper drum 8u of a rotary drum 8 on which heads are mounted respectively. Referring to FIGS. 2A and 2B, the rotary drum 8u is rotated in the clockwise direction shown by an arrow R and to the peripheral surface of the upper drum 8u, there are mounted 12 heads with an angular spacing of 30°. The digital audio signal is recorded and/or reproduced by two or three heads. When the PCM audio track is of a 2-channel system, as shown in FIG. 2A, there are provided audio signal recording heads 9a, 9b, video signal erase head 10, a video signal recording and/or reproducing head 11, a dummy head 12, reproduce heads 13a, 13b for confirming the recording of the audio signal, a reproduce head 14 for reproducing a video signal at a variable tape speed, a first audio signal reproduce head 15a, a first audio signal reproduce head 16a of variable tape speed type and corresponding second heads 15b and 16b.

When the PCM audio track is of a 3 channel-system, as shown in FIG. 2B, there are provided audio signal record heads 9a, 9b, 9c, a video signal erase head 10, a video signal record and/or reproduce head 11, reproduce heads 13a, 13b and 13c for confirming the recording of the audio signal, a video signal reproduce head 14 at a variable tape speed, audio signal reproduce heads 15a, 15b and 15c.

Figure 3:
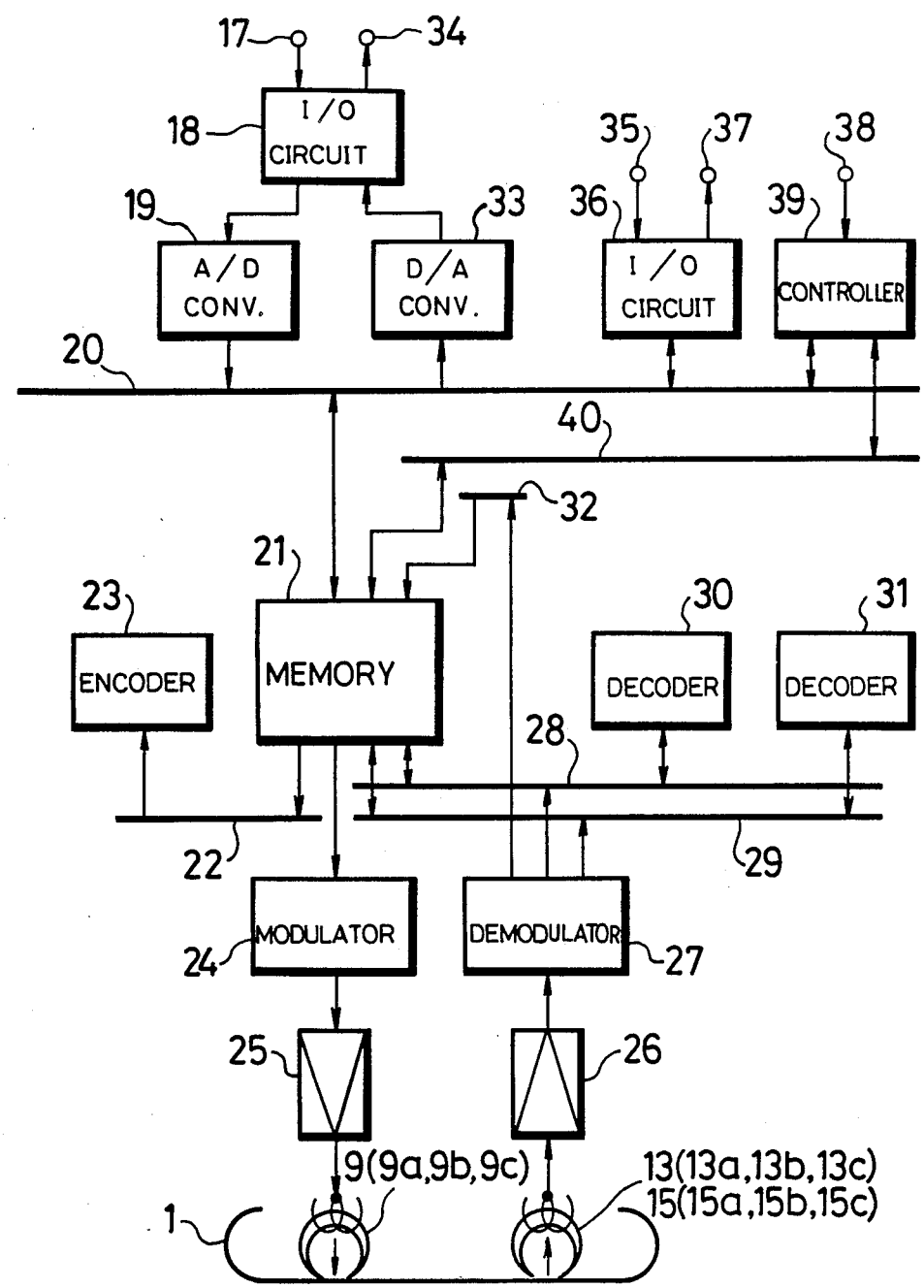
FIG. 3 is a block diagram showing an embodiment of a signal processing circuit according to the invention.

FIG. 3 is a block diagram of a PCM audio signal recording and/or reproducing system.

Referring to FIG. 3, an analog audio signal applied to an input terminal 17 is supplied through an I/O circuit 18 to an A/D (analog-to-digital) converter 19 in which the analog audio signal is converted to digital data. This digital data is supplied to a data bus 20. The data on the data bus 20 is supplied to a memory 21 and thereby stored.

The data stored in the memory 21 is supplied through a data bus 22 to an encoder 23 in which the data undergoes the encoding such as the addition of a predetermined error correction code, the re-arrangement of data and so on. The data from the memory 21 is further supplied to a modulator 24. Then, a signal resulting from modulating the data by the modulator 24 is supplied through a recording amplifier 25 to a recording head 9 (9a, 9b, 9c and thereby recorded on the magnetic tape 1 at its slanted tracks in the narrow width portion corresponding to the above mentioned synchronizing track.

Upon reproducing, a signal reproduced from the magnetic tape 1 by the reproduce head 13 (13a, 13b, 13c) and 15 (15a, 15b, 15c) is supplied through a playback amplifier 26 to a demodulator 27 and thereby the recorded digital data is demodulated The thus demodulated data is supplied to data buses 28 and 29. The data on the data buses 28 and 29 is supplied to the memory 21 and to first and second decoders 30 and 31. Further, the address of data detected by the demodulator 27 is supplied through an address bus 32 to the memory 21.

Then, the data undergoing the predetermined decoding such as the re-arrangement, the error correction and so on is supplied from the memory 21 to the data bus 20. The data on the data bus 20 is supplied to a D/A (digital-to-analog) converter 33 in which the digital data is converted to an analog audio signal. This analog audio signal is delivered through the I/O circuit 18 to an output terminal 34.

A signal from a digital signal input terminal 35 is supplied through a digital I/O circuit 36 to the data bus 20. The signal on the data bus 20 is supplied through the I/O circuit 36 to a digital signal output terminal 37.

Upon editing, data from another video tape recorder is supplied through a terminal 38 to an edition control circuit 39. The data from the edition control circuit 39 is supplied to the data bus 20 and the control signal detected by the edition control circuit 39 is supplied through an auxiliary bus 40 to the memory 21.

FIGS. 4A and 4B are timing charts respectively used to explain the recording and/or reproducing operation of the apparatus when the PCM audio track is of a 3-channel system. Throughout FIGS. 4A and 4B, longitudinal lines indicate the border lines between the adjacent fields FIG. 4A shows the recording operation of the apparatus.

Referring to FIG. 4A, the signal A/D-converted during, for example, a field "0" is encoded during the first half of a next field "1", timebase-compressed and then read out during the second half of this field "1" and then recorded by the record heads 9a, 9b and 9c. FIG. 4B shows, on the other hand, the reproducing operation of the apparatus. Referring to FIG. 4B, the signals reproduced by the reproduce heads 15a, 15b and 15c in the former half of, for example, a field "−2" are decoded over the period from the latter half of the field "−2" to the former half of a next field "−1", timebase-expanded, then D/A-converted and then delivered during the period of the next field "0".

Accordingly, in the above mentioned apparatus, when the signal is derived during the same field "0", the reproduce heads 15a, 15b and 15c must be located so as to precede the record heads 9a, 9b and 9c by the amount of more than 3 field periods. Then, in the case of the above mentioned apparatus, since the mounting positions of the reproduce heads 15a, 15b and 15c on the rotary drum 8 precede those of the record heads 9a, 9b and 9c by 90° in a rotation angle of the head drum, the practical preceding amount is $3\frac{1}{4}$ fields.

The record and/or reproduce data format on the above mentioned memory 21 for error correction coding the PCM audio data will be described below with reference to FIGS. 5A and 5B.

FIG. 5A illustrates the case of 2 tracks. Referring to FIG. 5A, each address on the memory 21 is formed of a data area of 8 bits and this address is provided in the form of XY matrix where 32 addresses are provided in the longitudinal direction and 184 addresses are provided in the lateral direction. Since the data is formed of 16 bits, the data is processed such that two addresses of the memory 21 are taken as one symbol a. Further, since the PCM audio signal is formed of, for example, 2-channel right and left stereo signals, the PCM signal is inputted and/or outputted under the condition that two symbols are taken as one sample b.

Also referring to FIG. 5A, the width of one sample b is taken as one stage. For 8 stages in the memory 21, three stages from the upper stage are assigned as first data stages A1, A2 and A3, the next one stage is assigned as an error correction code stage C2, the next two stages are assigned as second data stages A4 and A5 and the lower two stages are assigned as an error correction code stage C1.

For the thus constructed data stages, when one column of the address (in the longitudinal direction) is referred to as one block, 11 blocks from the left-hand side are assigned as a user's area in which data, such as, channel status and the like are written. The succeeding 81 blocks are assigned as a PCM signal area, the further succeeding 11 blocks are assigned another user's area again and the last 81 blocks are assigned as the PCM signal area. Thus, the PCM signals of 810 samples are written in the memory 21 by the total of both the PCM signal areas.

When the PCM signal is inputted, or written in the memory 21, the left-hand side PCM signal area is divided into 41 blocks in the left-hand side and 40 blocks in the right-hand side, while the right-hand side PCM signal area is divided into 20 blocks in the left-hand side, 41 blocks in the middle and 20 blocks in the right-hand side. Then, the respective samples of the PCM signal are interleaved, offset and then written in accordance with the above mentioned divided blocks in the sequential order shown by reference numerals in FIG. 5A.

The above mentioned error correction codes C1 and C2 are generated for the data symbols formed on the memory 21 as set forth above. Specifically, there is formed a interleave series c which starts from the upper symbol of the data stage A1, advances by 14 blocks in the right-hand direction, descends by one symbol and then ends at the lower symbol of the data stage A5. For 10 data symbols (20 addresses) contained in this interleave series c, there is generated an error correction code of 2 symbols (4 addresses) by, for example, (24, 20) reed solomon code. This error correction code is provided in two symbols $d_1$ and $d_2$ on the error correction code stage C2 within the above mentioned interleave series c.

Further, for 12 data symbols (24 addresses: containing the error correction code C2) contained in the block series e in the longitudinal direction, there is generated an error correction code of 4 symbols (8 addresses) by, for example, (32, 24) reed solomon code. This error correction code is provided in 4 symbols $f_1$ to $f_4$ on the error correction code stage C1 within the series e.

All the data symbols thus formed are timebase-compressed and then read out sequentially in the longitudinal direction from the left-hand side block so that 11 blocks of the left-hand side user's area and 81 blocks of the PCM signal area are modulated and then supplied to the record head 9a, while 11 blocks of the succeeding user's area and 81 blocks of the succeeding PCM signal area are modulated and teen fed to the record head 9b. The modulation is carried out in the manner of 8/10 (eight-to-ten) conversion method and NRZI (non-return-to-zero-inverted) modulation method wherein the synchronizing pattern of (0100010001) or (1100010001) is inserted into the data. Consequently, the data rate of the data to be recorded becomes 30.720 M bits/second and the recording wavelength becomes 1.67 μm at minimum and 6.68 μm at maximum. The recording is carried out in this way.

Upon reproducing, the data symbols reproduced by the reproduce heads 13a, 13b, 15a, 15b, 16a and 16b and demodulated are written in the memory 21 in which they are error-corrected by the error correction codes C1 and C2 and then the PCM signal is read out in the sequential order shown by reference numerals in FIG. 5A.

In this way, the PCM audio signal is recorded on and/or reproduced from two tracks. According to the above mentioned method, the data mutually interleaved are recorded on the respective tracks so that even when one track is dropped out, such dropout is interpolated by using the data of the other track, thus a satisfactory reproduced signal can be obtained. Further, since the data to be recorded and/or reproduced by the head with the letter b- is offset, even if a dropout extending over two tracks in the longitudinal direction of the magnetic tape 1 occurs, it is possible to obtain a reproduced signal by the interpolation of the dropout with the remaining data.

The above mentioned embodiment is applied to a television system of which the field frequency is 60 Hz (59.94 Hz). In that case, the number of samples per one second is 810×59.94=48,551.4 and this can cover the audio data whose sampling frequency is generally 48 kHz.

On the contrary, for the television system having the field frequency of 50 Hz, the capacity of the above mentioned embodiment becomes insufficient. Therefore, for the television system having the field frequency of 50 Hz, the track is divided into three tracks and then the recording and/or reproducing is carried out.

Figure 5B:
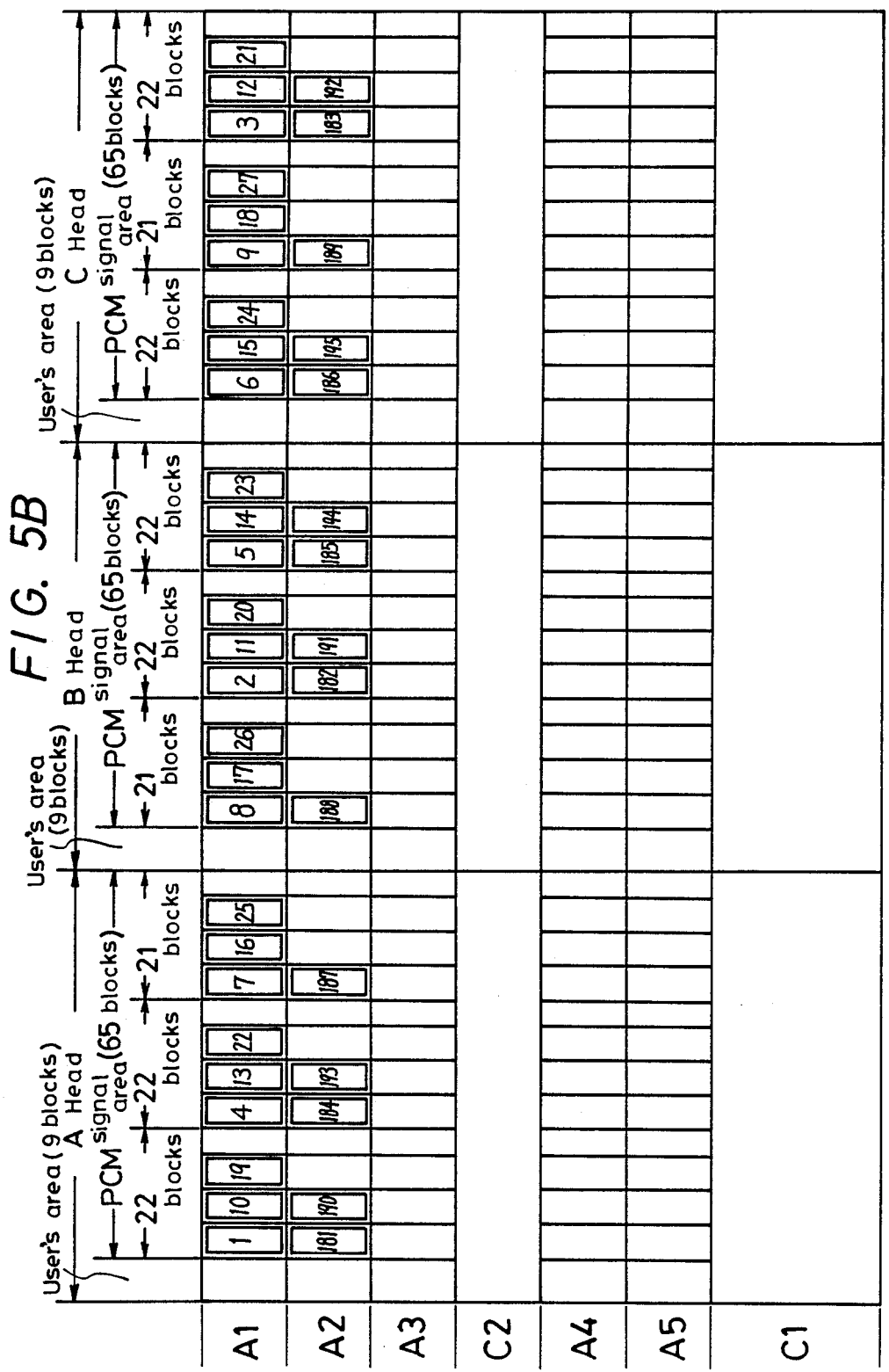

FIG. 5B shows the data format used therefor. In this example of the data format, the arrangement of the data format in the longitudinal direction is the same as the above mentioned one. According to the data format shown in FIG. 5B, there are provided 222 addresses (blocks) in the lateral direction. With respect to the 222 blocks, 9 blocks from the left-hand side are assigned as a user's area and succeeding 65 blocks are assigned as a PCM signal area. This arrangement is further repeated twice. As a result, the total number of samples in the PCM signal area becomes 975 and thus $975 \times 50 = 48,750$ which can cover the sampling frequency of 48 kHz.

When the PCM signal is inputted and/or outputted, the left-hand side PCM signal area is divided into three blocks or into 22 blocks in the left-hand side, 22 blocks in the middle and 21 blocks in the right-hand side; the central PCM signal area is divided into three blocks or into 21 blocks in the left-hand side, 22 blocks in the middle and 22 blocks in the right-hand side; and the right-hand side PCM signal area is divided into three blocks or into 22 blocks in the left-hand side, 21 blocks in the middle and 22 blocks in the right-hand side, respectively. Accordingly, in accordance with these divided blocks, the PCM signal is interleaved, offset and inputted and/or outputted in the sequential order shown by reference numerals in FIG. 5B.

The error correction code C2 is formed by an interleave series which advances by 16 blocks in the right-hand direction and descends by one symbol.

Other arrangements are made similarly to those of the above mentioned embodiment as described in FIG. 5A.

As mentioned above, the PCM audio signal can be similarly recorded and/or reproduced for the television system having the field frequency of 50 Hz.

By the way, for the television system having the field frequency of 60 Hz (59.94 Hz), the PCM audio signal can be recorded and/or reproduced by the application of this method in which the field frequency of 50 Hz is used.

Further, in an arrangement of another data format, it is possible that the number of blocks is 191 in the NTSC system and that it is 221 in the PAL and SECAM systems.

According to the present invention, since the recording and/or reproducing of each track is carried out with every small frame interleaved, if one frame of the PCM signal is divided into a plurality of tracks, the recording and/or reproducing can be carried out satisfactorily and accurately.

The decoding method for decoding the error correction code of the invention will hereinafter be described more fully.

Figure 6:
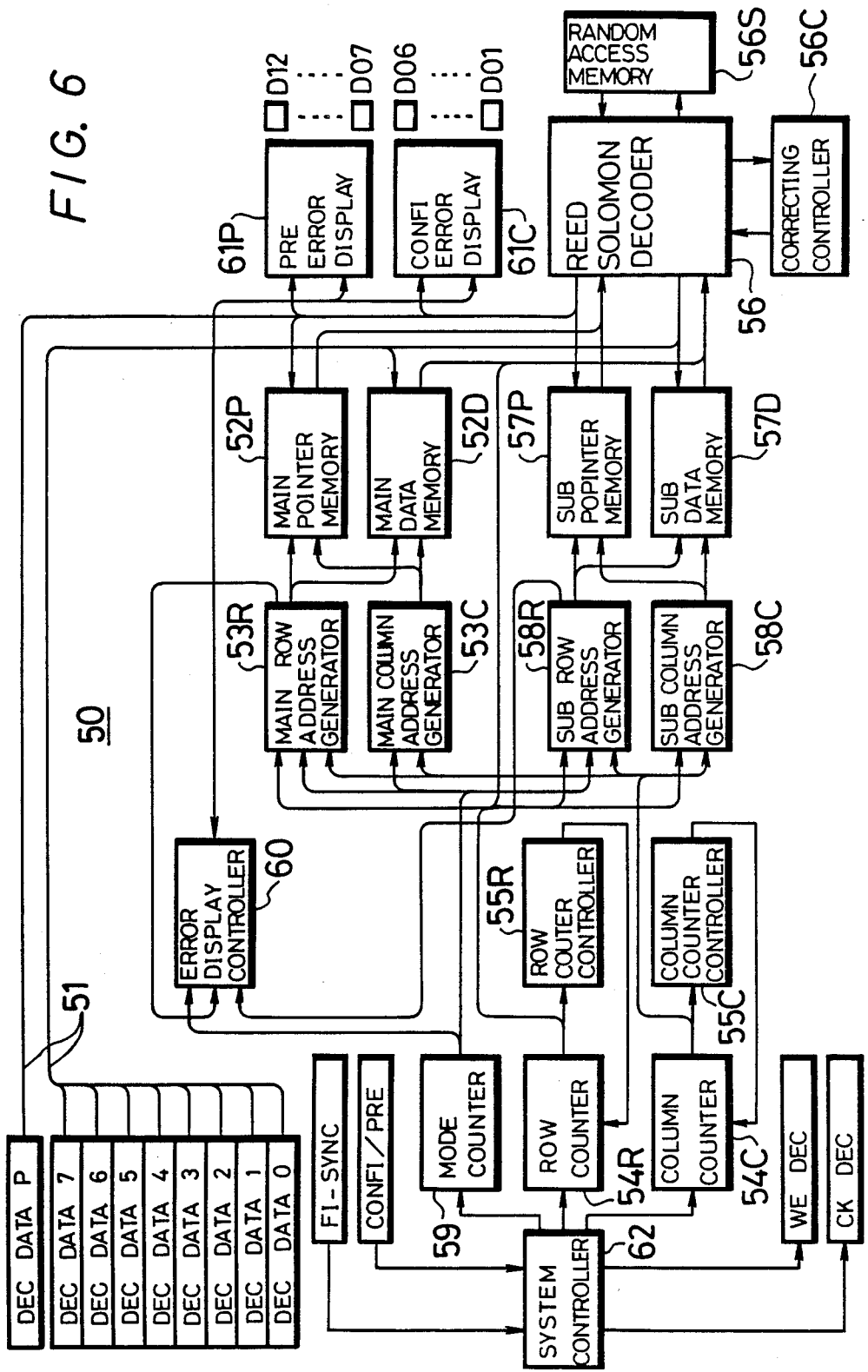
FIG. 6 is a block diagram showing a decoder for the error correction code shown in FIGS. 5A and 5B.

FIG. 6 illustrates one example of a construction which can realize the decoding method for decoding the error correction code according to the present invention.

In FIG. 6, reference numeral 50 generally designates an error correction code decoder. Referring to FIG. 6, in the error correction code decoder 50, a PCM signal reproduced is supplied and the PCM signal DEC data 0-7 applied to the input lines 51 is stored in a main data memory 52D. The read out and/or write from the main data memory 52D is controlled by using the address data from a main memory row address generator 53R and a main memory column address generator 53C. The address generators 53R and 53C are respectively controlled by a row counter 54R, a row counter controller 55R and a column counter 54C, a column counter controller 55C.

The reproduced PCM signals sequentially written in the main data memory 52D are again read out and fed to a reed solomon decoder 56. In that case, the block address derived from the row column counter 54R is added to the head of the data of each block series e. The reed solomon code decoder 56 carries out the error detection and the error correction of the data of the block series by using the error correction code C1. In the error correction mode using the errors, correction code C1 (C1 mode), up to 3-word error can be corrected as shown in a flow chart of FIG. 7, by way of example. After the error is corrected, an error pointer corresponding to the state of the error correction state is outputted together with the data. In this C1 correction mode, when it is judged that the block address is erroneous, the error pointer is generated for the data of all blocks. Turning back to FIG. 6, the data thus error-corrected is stored in a sub data memory 57D and the error pointer is stored in a sub pointer memory 57P. The read and/or write operations of the respective memories 57D and 57P are controlled by the address data derived from a sub row address generator 58R and a sub column address generator 58C similarly to the main data memory 52D. The address generators 58R and 58C are controlled by the row counter 54R, the row counter controller 55R, the column counter 54C, the column counter controller 55C, respectively.

The reason that the data read out from the reed solomon code decoder 56 is not written in the main data memory 52D but in the sub data memory 57D will be described below. That is, the data processing in the reed solomon code decoder 56 is carried out in a pipe-line system. So, by the fact that the reading of the data for the main data memory 52D and the writing of the data into the sub data memory 57D are carried out simultaneously, the data can be processed at higher speed.

Figure 7:
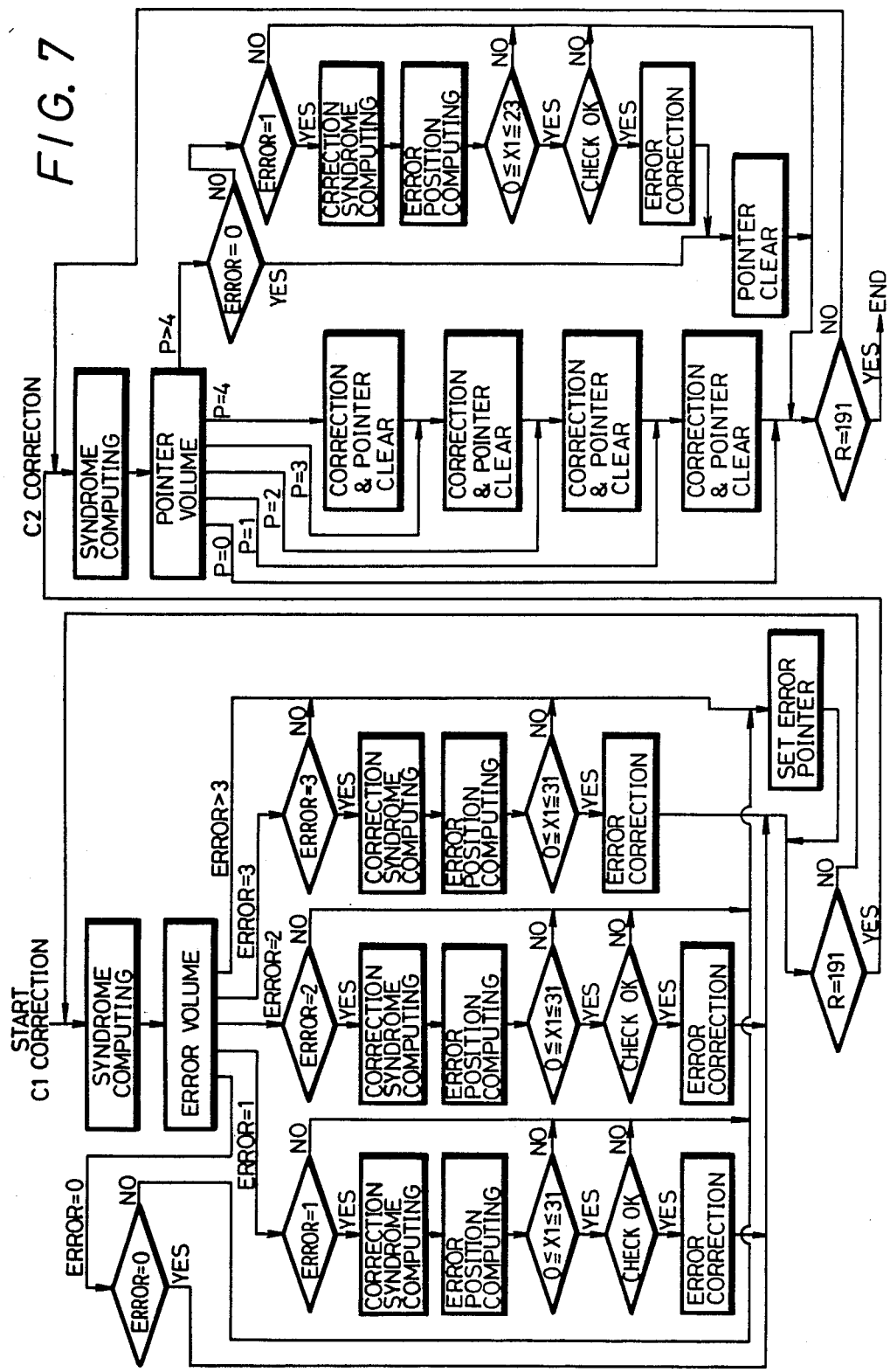
FIG. 7 is a flow chart showing an error correction algorithm for the decoder shown in FIG. 6.

The data and the pointer again read out from the sub data memory 57D and the sub pointer memory 57P are supplied again to the reed solomon code decoder 56. In the reed solomon code decoder 56, the data of the interleave series c is erased and then corrected by using the error correction code C2 and the pointer generated in the C1 mode. In the C2 correction mode, up to 4-word errors can be corrected as shown in FIG. 7, by way of example. If a 5-word error occurs, it is set that one-word error correction is to be carried out. The pointer is generated together with the error-corrected data. In this case, a random access memory (RAM) 56S is an auxiliary memory used to delay the data necessary for the processing of the reed solomon code decoder 56. The processing step of the reed solomon code decoder 56 is controlled by a controller 56C.

The data corrected in the C2 mode is stored again in the main data memory 52D and the error pointer is stored in the main pointer memory 52P. The read and/or write operation of the main pointer memory 52P is controlled similarly to the main data memory 52D. The data error-corrected twice in the C1 mode and C2 mode are delivered from the main data memory 52D and fed to the input and output lines 51 together with the pointer generated from the main pointer memory 52P. In this case, a mode controller 59 is used to generate the respective operation mode signals of the decoder 50 to thereby switch the ROM maps or tables of the address generators 53R, 53C, 58R and 58C. In consequence, it is possible to produce the addresses corresponding to the C1 mode and C2 mode.

By the way, when the PCM signal is divided into A, B and C head systems and then recorded and/or reproduced as described above, the recording characteristics of the respective head systems A, B and C are not deteriorated uniformly but there is such a case that only the recording characteristic of one of them is deteriorated to cause a difficulty recording and/or reproducing. In that case, often the recording characteristic can be set at a desired state by electrically adjusting the head.

Therefore, for example, the processing by the error detection and error correction code C1 is checked. Since this processing is carried out in the sequential order of the heads A, B and C, the detection with the heads A, B and C designated can be carried out relatively easily. In this case, however, the signal processing carried out here is executed along the block series and the sequential order of this signal processing is the same as the sequential order of the recording and/or reproducing of the signal so that most of the errors detected are caused by the dropout in the magnetic tape and the like.

While, the signal processing by the error detection and error-correction C2 mode is carried out along the interleave series so that without being affected by the dropout of the magnetic tape and the like, only the deterioration of the head characteristic can be detected. In this case, since the interleave series is extended over respective small frames that can be recorded and/or reproduced by the heads A, B and C, it is difficult to specify the heads A, B and C from the symbols which can not be error-detected and error-corrected.

Therefore, if a data corresponding to the reproduce head is prepared in a conversion table in response to the output of the row counter 54R, it becomes possible to specify the reproduce head in response to the output from the conversion table. As, for example, shown in FIG. 6, the conversion table in response to the output from the row counter 54R is prepared respectively in the vacant areas of the main row address generator 53R and the sub row address generator 58R to thereby generate therefrom a head number signal which will specify the reproduce head. Reference numeral 60 designates an error display controller which is supplied with the error correction mode signal from the mode counter 59, the above head number signal and also an information indicative of whether the playback is carried out by the pre-read heads a 15a, 15b and 15c or so-called confidential (monitor playback) heads 13a, 13b and 13c. The output of the controller 60 is used to control through error display circuits 61P and 61C their 12 LEDs (light emitting diodes) D01 to D12 together with the error status flag from the reed solomon code decoder 56 which represents that the data is corrected, is not corrected or the data is corrected through which series. Accordingly, at every pre-read head playback and the monitor playback, the error status can be displayed for each head A, B and C. For example, when the error is detected in the C1 series, the green LED is lit. Further, when the error can not be corrected in the C2 series, the red LED is lit. In this case, a system controller 62 is adapted to totally control the above mentioned circuits on the basis of the synchronizing signal of the input data.

In this way, the error generation status is detected and then displayed for every head. According to the above mentioned apparatus, the head can be specified from the address signal with ease by using the conversion table corresponding to the series of the error detection and error correction. Accordingly, the head whose characteristic is deteriorated can be detected and displayed with great ease. Further, the electrical adjustment or the like can be carried out for the detected head properly.

Further, according to the present invention, since the table is used to identify the divided small frame corresponding to the sequential order of the symbols of the digital signal, the head can be easily specified from the symbol whose error is detected and hence, the head whose characteristic is deteriorated can be detected and then displayed with great ease.

By the way, in such apparatus, when the video signal system is driven in the NTSC color system, its field frequency is about 59.94 Hz, while a sampling frequency fs which becomes an integer multiple of the above mentioned field frequency becomes about 44.056 kHz.

On the other hand, general PCM apparatus frequently use the sampling frequency fs of 44.1 kHz. Therefore, it is proposed to record such signal in the above mentioned video tape recorder in the form of the PCM signal. In that case, however, the sampling frequency fs does not become an integer multiple of the field frequency so that upon recording mode, a fraction is generated at every field.

Although it may be considered, in that case, that the recording is carried out with the fraction being removed and that such fractional portion is processed as a dropout in the reproducing mode, there is then a fear that the quality of the reproduced signal which is made from the PCM signal will be deteriorated.

Further, it may be considered that the sampling frequency fs be converted from 44.1 kHz to 44.056 kHz by using a so-called rate converter. Such rate converter, however, is very complicated in circuit arrangement and this considerably increases the cost of the product.

By the way, the PCM signal having the sampling frequency of 44.1 kHz has a PCM signal having 735.735 samples during one field period (about 1/59.94 second) of the NTSC color system. Accordingly, if 200 field periods are taken into consideration, the number of the samples becomes 147147 which is an integer.

Therefore, as shown in FIG. 8A, 200 field periods are taken as a unit and this field unit is divided into 50 blocks of 4 fields. Of these, each of 4 fields of, for example, the first block [1] is constructed by 735 samples, while in each of other blocks [2] to [50], the first field is constructed by 735 samples and other three fields are constructed by 736 samples. According to this data format, when the 200 fields are passed, the total number of the samples becomes 147147 samples so that all samples can be recorded on the tape.

On the other hand, the PCM signal supplied has in its one field 735.735 samples as shown in FIG. 8B. Accordingly, in the first field of the first block [1], only 735 samples are recorded relative to 735.735 samples supplied so that for 0.735 samples of the fraction the memory of one sample amount is used to thereby carry the fraction to the field 2. In the field 2, for 1.47 samples which are the total number of the carried amount of the field 2 and the fraction of this field, the same is carried to the field 3 by using the memory of 2 samples. In the field 3, for 2.235 samples which are the total number, the same is carried to the field 4 by using the memory of 3 samples. In the field 4, for the totally 2.94 samples, the same is carried to the second block [2] by using the memory of 3 samples.

Further in the first field of the block [2], for 3.675 samples which are the total samples of carried amount an the fraction of this field, the same is carried to the field 2 by using the memory of 4 samples. In the field 2, since the sample number to be recorded is 736 samples, for 3.41 samples which result from reducing the insufficient amount by the carried amount, the same is carried to the field 3 by using the memory of 4 samples. In the field 3, for 3.145 samples thus reduced, the same is carried to the next field 4 by using the memory of 4 samples. In the field 4, for 2.88 samples thus reduced, the same is carried to the third block [3] by using the memory of 3 samples.

Thereafter, from the carried amount there is reduced 0.06 samples each at every block and the carried amount becomes zero in the field 4 of 50th block [50].

As described above, the PCM signal with the sampling frequency fs of 44.1 kHz can be recorded on the video tape recorder driven in the NTSC color system. In this case, when the data format therefor is made, by only using the memory in which 4 samples are added to 736 samples of one field period, it is possible to make the data format therefor very easily.

FIG. 9 is a block diagram schematically showing an example of a flow of a signal presented when the above data format is made.

Referring to FIG. 9, a video signal applied to an input terminal 70 is supplied to a recording circuit 71 in which it is modulated to a predetermined recording signal. This video signal is then supplied through a record/reproduce change-over switch 72 to a video signal record/reproduce head 11. The signal reproduced by the record/reproduce head 11 is supplied through the switch 72 to a reproducing circuit 73 and a predetermined demodulated video signal therefrom is delivered to an output terminal 74. Upon recording, the synchronizing signal and the like from the recording circuit 71 is supplied to a servo circuit 75 which synchronously controls a drum motor 76 and the like.

A PCM audio signal with a sampling frequency fs of 44.1 kHz applied to an input terminal 35 is supplied to a memory 21a and the clock signal contained in this PCM audio signal is supplied to an address control circuit 77, whereby each sample having the sampling frequency of 44.1 kHz is sequentially recorded in the memory 21a. The signal previously reproduced by the reproduce head 15 (15a, 15b and 15c) is supplied through a reproducing circuit 78 to a field number detecting circuit 79 in which a field number of a track to be recorded is calculated from the detected field number and then fed to the address control circuit 77. As a result, on the basis of this field number detected, 735 or 736 samples are sequentially read out from the memory 21a in accordance with the above mentioned format. The sample thus read is supplied via a recording circuit 80 to the record head 9 (9a, 9b, 9c).

Upon reproducing, the signal from the reproducing circuit 78 is supplied to a memory 21b and the field number from the detecting circuit 79 is supplied to an address control circuit 81 whereby in accordance with the above mentioned data format, 735 or 736 samples are written at every field in sequence. Further, the clock signal having the frequency of 44.1 kHz supplied to the terminal 37 is supplied to the address control circuit 81 and the PCM audio signal read in synchronism with this clock signal is converted to an analog audio signal by the D/A converter 33 and then delivered to the output terminal 34.

The memories 2a and 2b may be single in practice and correspond to the memory 21 shown in the block diagram of FIG. 3.

Upon edition and the like, when the PCM signal processed with the above mentioned data format is inputted, it is sufficient that the sample is carried in accordance with the field number. At that time, it is sufficient to provide a memory of 3 samples in addition. When an effect such as a cross-fade and so on is employed at the edit point, the 3 samples to be carried may be removed.

According to the present invention as set forth above, since all the samples can be recorded by making the data in the predetermined data format, it is possible to record and/or reproduce the PCM audio signals which are not synchronized satisfactorily and accurately.

The above description is given on the preferred embodiments of the invention but it will be apparent that many modifications and variations could be effected by one skilled in the art without departing from the spirits or scope of the novel concepts of the invention so that the scope of the invention should be determined by the appended claims only.

We claim as our invention:

1. Method for recording a digital signal, comprising the steps of:
   receiving a digital signal consisting of blocks each including a plurality of symbols, the number of symbols of said digital signal included in each block varying according to a predetermined sequence;
   interleaving said plurality of symbols over the extent of each of said blocks;
   dividing each of said blocks into a plurality of sub-blocks; and recording said symbols in said plurality of sub-blocks with a plurality of different recording heads at every sub-block, respectively, whereby said symbols of said digital signal may be received asynchronously from said recording of said sub-blocks.

2. Method according to claim 1, wherein the number of said plurality of different recording heads is two.

3. Method according to claim 1, wherein the number of said plurality of different recording heads is three.

4. Method according to claim 1, further comprising the step of generating an error correction code from each series of interleaved symbols in a predetermined direction.

5. Method according to claim 4, wherein the initial symbol recorded with different recording heads among said symbols in respective series of said error correction code is included in different order of said sub-block recorded with different recording heads.

6. Method for reproducing a digital signal consisting of blocks each including a plurality of symbols interleaved over the extent of each of said blocks, the number of symbols of said digital signal included in each block varying according to a predetermined sequence, which is divided into a plurality of sub-blocks each recorded on a different track; the method comprising the steps of:
   reproducing said symbols of said digital signal with a plurality of different reproducing heads at every sub-block, respectively; de-interleaving said plurality of symbols over the extent of each of said blocks; and outputting said de-interleaved symbols, whereby said symbols of said digital signal may be reproduced asynchronously from said reproduction of said sub-blocks.

7. Method according to claim 6, wherein the number of said plurality of different reproducing head is two.

8. Method according to claim 6, wherein the number of said plurality of different reproducing heads is three.

9. Method according to claim 6, wherein each of said series of interleaved symbols includes an error correcting code in a predetermined direction and the method further comprising the step of decoding each error correction code.

10. Method according to claim 9, wherein each of said sub-blocks includes another error correction code and the method further comprising the step of decoding each of another error correction code.

11. Method according to claim 10, further comprising the step of detecting which reproducing head causes an error.

12. Apparatus for recording a digital signal comprising:
means for receiving a digital signal consisting of blocks each including a plurality of symbols, the number of symbols of said digital signal included in each lock varying according to a predetermined sequence;
memory means for storing said digital signal;
address means for interleaving said plurality of symbols over the extent of each of said blocks and for dividing each of said blocks into a plurality sub-blocks; and
means for recording said symbols in said plurality of sub-blocks with a plurality of different recording heads at every sub-block, respectively, whereby said symbols of said digital signal may be received asynchronously from said recording of said sub-blocks.

13. Apparatus according to claim 12, wherein the number of said plurality of different recording head is two.

14. Apparatus according to claim 12, wherein the number said plurality of different recording heads is three.

15. Apparatus according to claim 12, further comprising means for generating an error correction code from each series of interleaved symbols in a predetermined direction.

16. Apparatus according to claim 15, wherein the initial symbol recorded with different recording heads among said symbols in respective series of said error correction code is included in different order of said sub-blocks recorded with different recording heads.

17. Apparatus for reproducing digital signal consisting of blocks each including a plurality of symbols interleaved over the extent of each of said blocks, the number of said symbols of said digital signal in each block varying according to a predetermined seqeunce, which is divided into a plurality of sub-blocks each recorded on different tracks; the apparatus comprising;
means for reproducing said symbols of said digital signal with a plurality of different reproducing heads at every sub-block, respectively;
means for de-interleaving said plurality of symbols over the extent of each of said blocks; and
means for outputting said de-interleaved symbols, whereby said de-interleaved symbols of said digital signal may be reproduced asynchronously from said reproduction of said sub-blocks.

18. Apparatus according to claim 17, wherein the number of said plurality of different reproducing heads is two.

19. Apparatus according to claim 17, wherein the number of said plurality of different reproducing heads is three.

20. Apparatus according to claim 17, wherein each of said series of interleaved symbols includes an error correcting code in a predetermined direction and the apparatus further comprising means for decoding each error correction code.

21. Apparatus according to claim 20, wherein each of said sub-blocks includes another error correction code and the apparatus further comprising means for decoding each of said another error correction code.

22. Apparatus according to claim 21, further comprising means for detecting which reproducing head causes an error.

23. Method for recording a video signal having a predetermined field frequency and a digital signal having a predetermined sampling frequency, comprising the steps of: receiving a digital signal including a plurality of symbols together with said video signal;
dividing said video signal into a plurality of units each including a first predetermined number J of fields;
dividing said respective units into a second predetermined number K of blocks each including a third predetermined number L (J=KL) of fields;
recording said digital signal so that a fourth predetermined number M of said symbols are included in every third predetermined number L of fields of one of said second predetermined number K of blocks and that said fourth predetermined number M of said symbols are included in one of third predetermined number L of fields and a fifth predetermined number N of said symbols are included in the other of third predetermined number L of fields of the other blocks.

24. Method according to claim 23, wherein said first predetermined number J is 200; said second predetermined number K is 50; a third predetermined number L is 4; a fourth predetermined number M is 735; a fifth predetermined number N is 736.

* * * * *

UNITED STATES PATENT AND TRADEMARK OFFICE
CERTIFICATE OF CORRECTION

PATENT NO. : 4,839,750  
DATED : June 13, 1989  
INVENTOR(S) : Tetsuro Kato

Page 1 of 2

It is certified that error appears in the above-identified patent and that said Letters Patent is hereby corrected as shown below:

Col. 3, line 56, after "mounted" insert --,--

Col. 4, line 29, after "9c" insert --)-- same line, after "demodulated" insert --.-- line 67, after "fields" insert --.--

Col. 6, line 4, change "a" to --an-- line 29, change "teen" to --then-- line 54, change "b-" to --b--

Col. 8, line 13, after "series" insert --e-- line 38, change "for" to --from--

Col. 9, line 20, after "series" insert --e-- line 28, after "series" insert --c-- line 31, after "series" insert --c--

Col. 11, line 8, change "an" to --and--

UNITED STATES PATENT AND TRADEMARK OFFICE
CERTIFICATE OF CORRECTION

PATENT NO. : 4,839,750  Page 2 of 2
DATED : June 13, 1989
INVENTOR(S) : Tetsuro Kato It is certified that error appears in the above-identified patent and that said Letters Patent is hereby corrected as shown below:

line 22, change "sam" to --sam- --.

Col. 12, line 6, change "2a and 2b" to --21a and 21b

IN CLAIMS:

Col. 13, line 29, change "lock" to --block--

Col. 13, line 34, after "plurality" insert --of-- line 43, change "head" to --heads-- line 46, after "number" insert --of-- line 57, after "reproducing insert --a--

Signed and Sealed this

Twenty-third Day of April, 1991

Attest:

HARRY F. MANBECK, JR.

*Attesting Officer*  *Commissioner of Patents and Trademarks*